United States Patent
Yamamoto et al.

(10) Patent No.: US 7,576,467 B2
(45) Date of Patent: Aug. 18, 2009

(54) ARMATURE AND MOTOR ON WHICH THE ARMATURE IS MOUNTED

(75) Inventors: Masato Yamamoto, Kyoto (JP); Yoichi Mori, Kyoto (JP); Hitoshi Urakami, Kyoto (JP)

(73) Assignee: Nidec Corporation, Kyoto (JP)

( * ) Notice: Subject to any disclaimer, the term of this patent is extended or adjusted under 35 U.S.C. 154(b) by 419 days.

(21) Appl. No.: 11/512,240

(22) Filed: Aug. 30, 2006

(65) Prior Publication Data

US 2007/0046132 A1 Mar. 1, 2007

(30) Foreign Application Priority Data

Aug. 31, 2005 (JP) ............................. 2005-251048

(51) Int. Cl.
*H02K 1/28* (2006.01)
*H02K 1/12* (2006.01)

(52) U.S. Cl. ....................................... 310/218; 310/215

(58) Field of Classification Search ............. 310/42–43, 310/216–218, 215; 336/212, 233, 234
See application file for complete search history.

(56) References Cited

U.S. PATENT DOCUMENTS

| 6,049,153 | A | * | 4/2000 | Nishiyama et al. ...... 310/156.53 |
| 6,369,687 | B1 | * | 4/2002 | Akita et al. .................. 336/234 |
| 6,646,535 | B2 | * | 11/2003 | Miyake et al. .............. 336/212 |
| 6,661,147 | B2 | * | 12/2003 | Tajima et al. ................ 310/216 |
| 7,067,952 | B2 | * | 6/2006 | Neal .......................... 310/259 |
| 7,262,527 | B2 | | 8/2007 | Neal | |

FOREIGN PATENT DOCUMENTS

JP 2002-84698 A 3/2002

\* cited by examiner

*Primary Examiner*—Tran N Nguyen
(74) *Attorney, Agent, or Firm*—Westerman, Hattori, Daniels & Adrian, LLP.

(57) ABSTRACT

An extension part of an insulator covering a part of a coupling portion of a laminated core of an armature is inclined to the inside in the radial direction along the coupling part. A inclined face which is extended inward in the radial direction is formed in the cylindrical part of the armature. By forming the armature in an annular shape, a gap which is almost parallel or narrowed to the inside in the radial direction is formed between neighboring inclined faces. The gap is formed to be smaller than the diameter of a conductor.

8 Claims, 7 Drawing Sheets

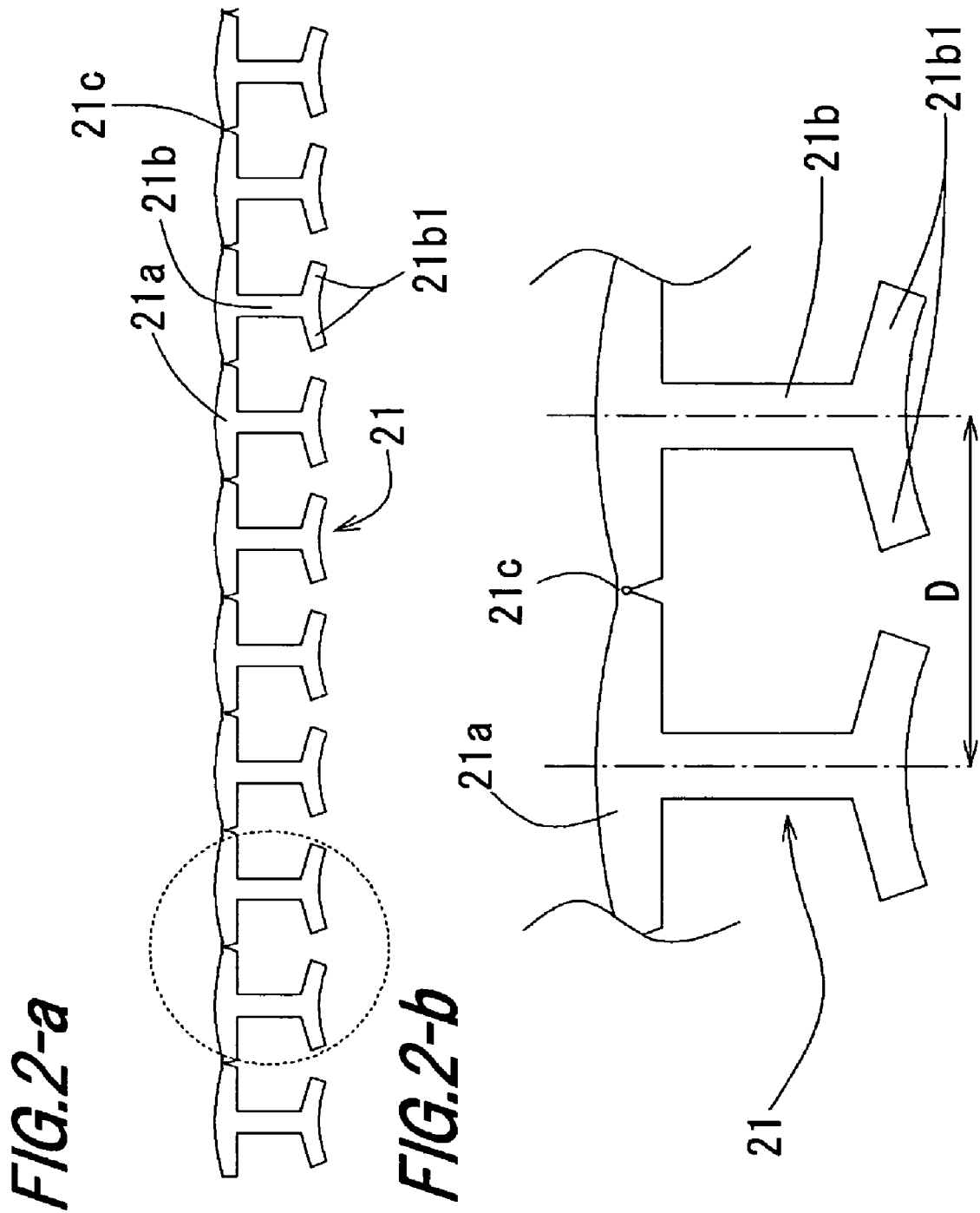

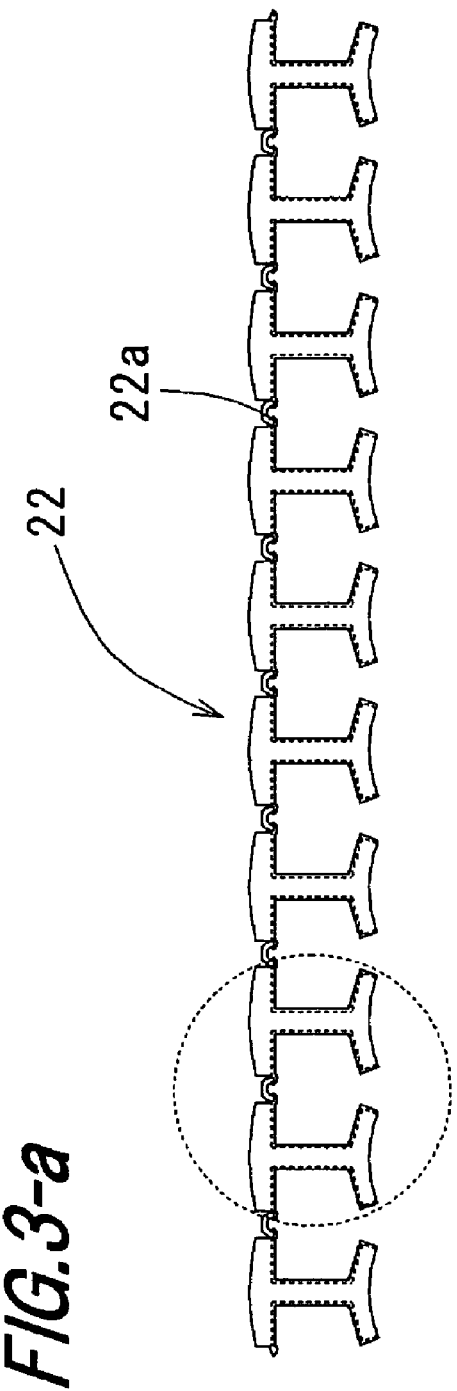
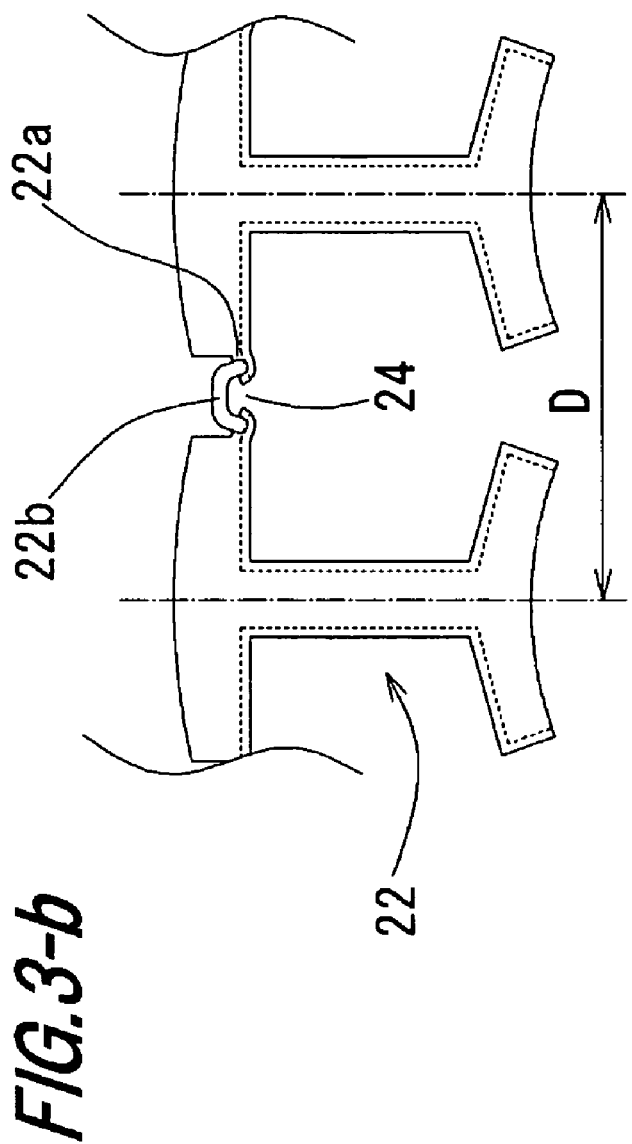
FIG.3-a
FIG.3-b

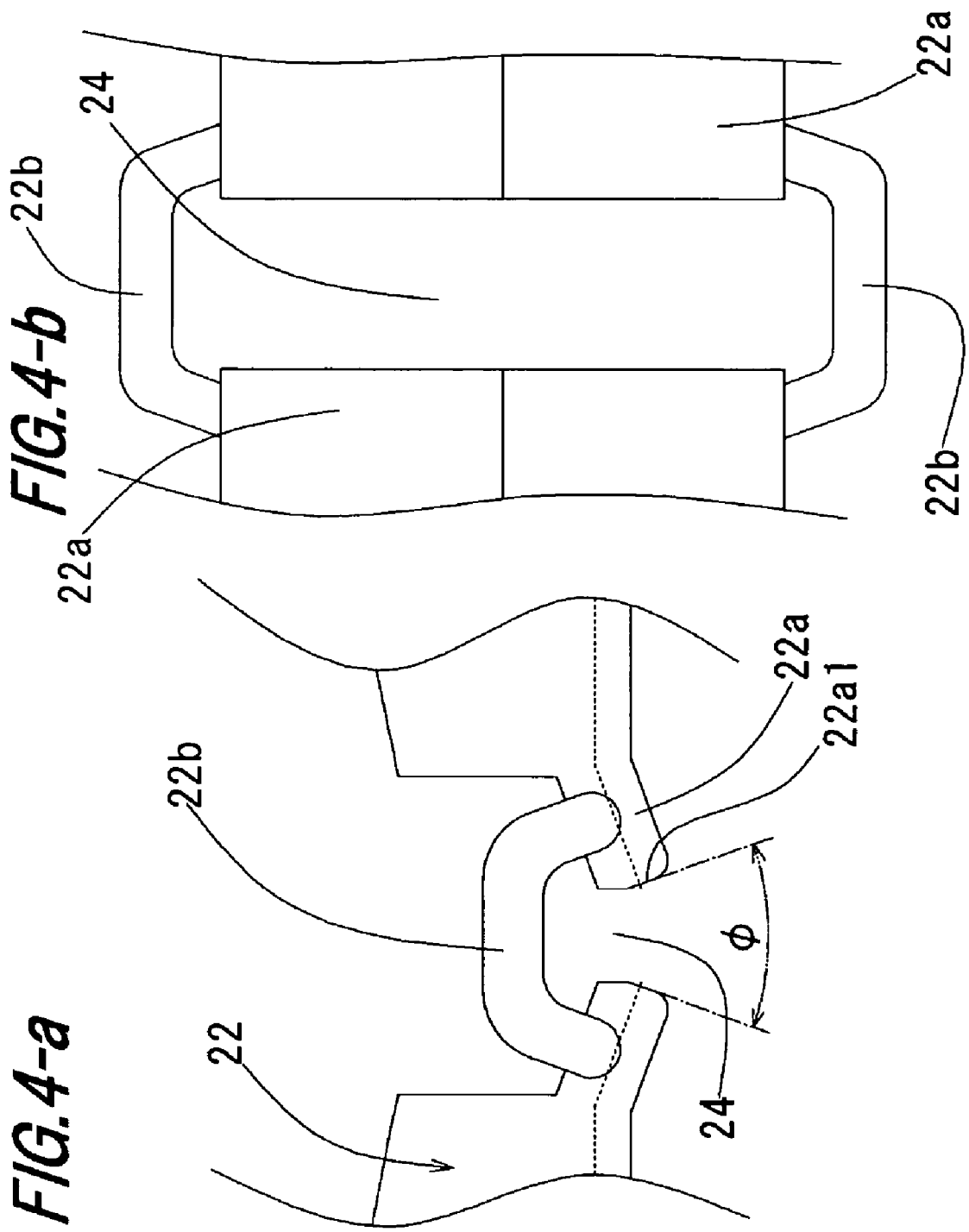

ARMATURE AND MOTOR ON WHICH THE ARMATURE IS MOUNTED

BACKGROUND OF THE INVENTION

1. Technical Field

The present invention relates to an armature mounted on a motor and, more particularly to the shape of an insulator for insulating the armature.

2. Description of Related Art

One of methods for improving the space factor of a conductor wound around an armature is a method of winding a conductor around laminated cores which are arranged in an almost straight state and, after that, bending the laminated cores in an annular shape. When the laminated cores are in a straight state, the intervals between neighboring teeth can be made large. Therefore, the space factor of the conductor can be improved, and it can contribute to increase in the efficiency of the motor.

The conductor is wound continuously so as to run from a predetermined tooth to another predetermined tooth. However, when the laminated cores are bent in the annular shape, there is the possibility such that the conductor that runs between the teeth is caught between the neighboring laminated cores and, when current is passed in such a state, electric short-circuit occurs.

BRIEF SUMMARY OF THE INVENTION

The present invention provides an armature formed in an annular shape by bending laminated cores, wherein the size of a gap in the circumferential direction between inner peripheral faces which are neighboring in the circumferential direction of insulators that cover the inner peripheral faces of core back parts of laminated cores of the insulators, is smaller than the diameter of the conductor which is wound around the teeth.

The conductor is continuously wound around a plurality of teeth in a state where the laminated cores are in an almost straight state or in a bent state where the teeth face outward. The conductor is wound around the teeth while passing along the circumferential faces of core back parts, which become the inner peripheral faces at the time of completion.

The laminated cores are bent annularly. At this time, the size of the gap in the circumferential direction of the inner peripheral surfaces of the insulators neighboring in the circumferential direction is decreased by bending the laminated cores. Since the size of the gap is set so as to be smaller than the diameter of the conductor, when the laminated cores are bent annularly, the conductor can be prevented from being caught between the core back parts. Consequently, occurrence of electric short circuit between the laminated cores and the conductor can be prevented.

DESCRIPTION OF THE DRAWINGS

FIG. 2A is a top plan view of laminated cores as an example of laminated cores of the present invention, and FIG. 2B is an enlarge view of a dot-line circle of FIG. 2A.

FIG. 3A is a top plan view of an insulator as an example of an insulator of the invention, and FIG. 3B is an enlarged view of a dot-line circle of FIG. 3A.

FIG. 4A is an enlarged view of an insulator coupling part in FIG. 3B, and FIG. 4B is a front plan view.

DETAILED DESCRIPTION OF THE INVENTION

General Structure of Brushless Motor

Figure 1:
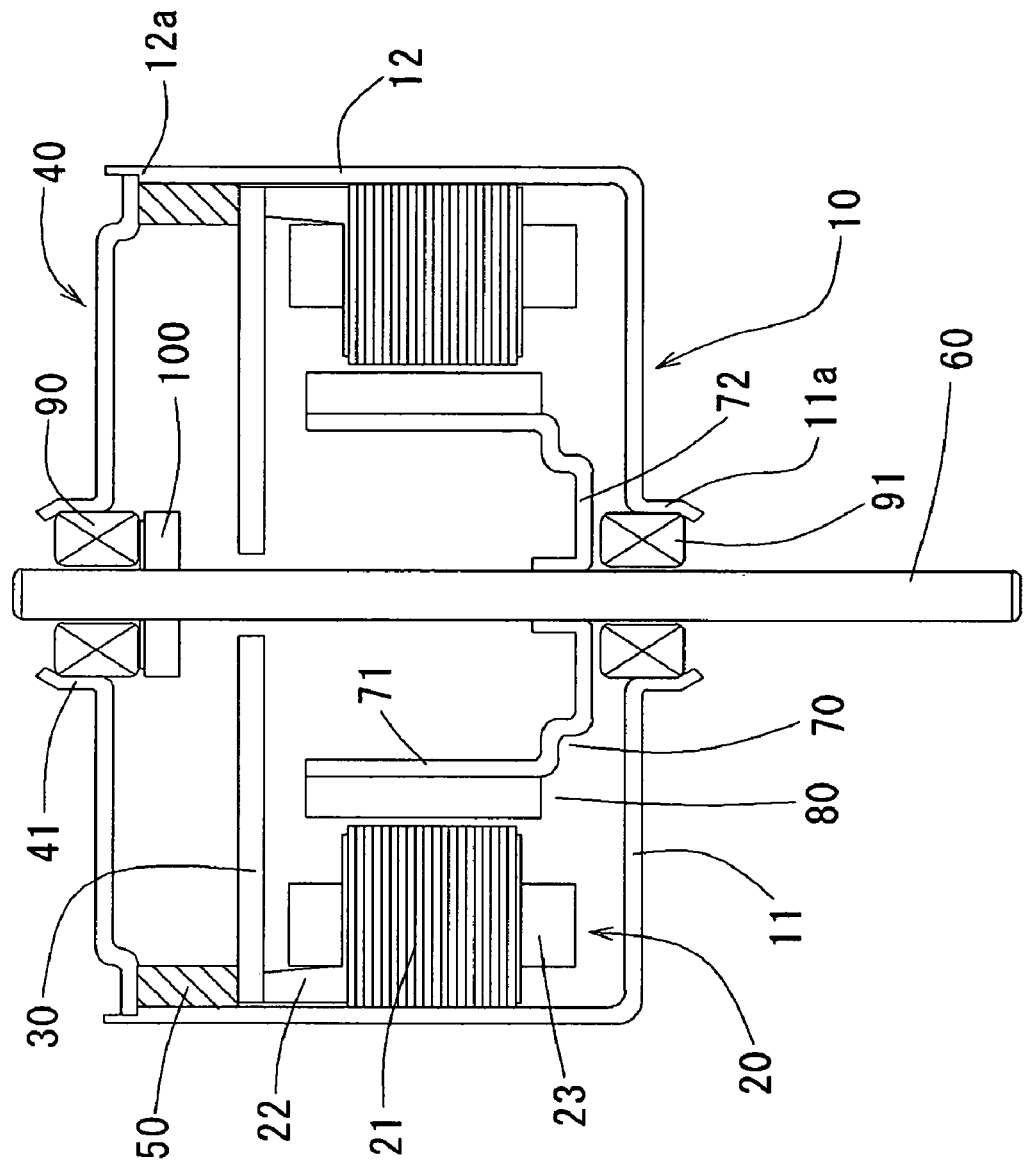
FIG. 1 is a schematic cross section taken in the axial direction and showing an example of a brushless motor of the present invention.

FIG. 1 is a schematic cross section showing an example of an embodiment of a brushless motor according to the present invention. In the following, description of directions such as upper and lower directions in the specification is description corresponding to the diagrams, and the directions are not limited in actual embodiments.

Referring to FIG. 1, in a cover 10 formed in a bottomed cylindrical shape with the upper side open, a lower-side annular projection 11a which is opened in a center part of a bottom 11 is formed. In a cylindrical part 12 of the cover 10, an armature 20 formed in an annular shape is fixed.

The armature 20 is constructed by a laminated core 21 in which thin films are laminated, an insulator 22 covering the laminated core 21, and a coil 23 formed by winding a conductor around the laminated core 21 and the insulator 22 in a plurality of layers. A circuit board 30 which rotates when power is supplied from the outside is disposed so as to be in contact with the top face of the insulator 22. The conductor is formed by covering a copper wire with an insulating film.

A step 12a is formed above the circuit board 30 in the cylindrical part 12 of the cover 10. A plate 40 that covers the upper side of the cover 10 is fixed to the step 12a. An upper annular projection 41 is formed in the center of the plate 40.

In a gap in the axial direction between the circuit board 30 and the plate 40, a holding member 50 formed by an annular-shaped elastic member is disposed. The holding member 50 holds the circuit board 30 by sandwiching the circuit board 30 between itself and the insulator 22 in the axial direction while being in contact with the circuit board 30 and the plate 40.

To a cylindrical shaft 60 which rotates coaxially with the rotation axis, a rotor holder 70 formed in a bottomed cylindrical shape having a through hole for fixing the shaft 60 and with the upper side open is fixed. A magnet 80 for driving is fixed to the outer peripheral surface of a cylindrical part 71 of the rotor holder 70 so as to face the inner peripheral surface of the armature 20 with a space in the radial direction.

To rotatably support the shaft 60, an upper bearing 90 and a lower bearing 91 are fixed to the upper annular projection 41 and the lower annular projection 11a, respectively. To the lower side of the upper bearing 90 of the shaft 60, an almost-disc-shaped retaining member 100 for preventing the shaft 60 from coming off to the upper side is fixed. The bottom 72 of the rotor holder 70 plays the role of the retaining member to prevent the shaft 60 from coming off to the lower side.

By passage of current supplied from the outside and controlled via the circuit board 30 to the armature 20, magnetic fields are generated in the armature 20. By the mutual action between the magnetic fields and the driving magnet 80, driving force is obtained to rotate the armature 20.

Main Part

Figure 5:
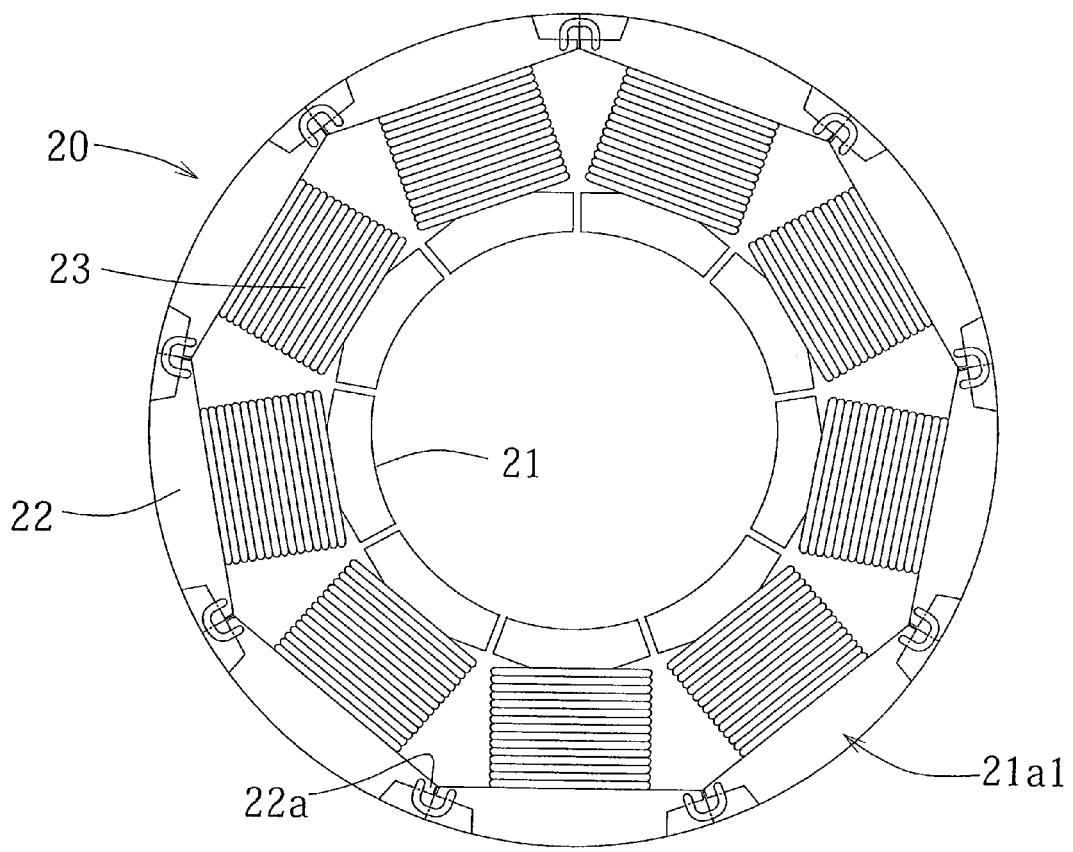
FIG. 5 is a top plan view of an armature as an example of an armature of the invention.
Figure 6:
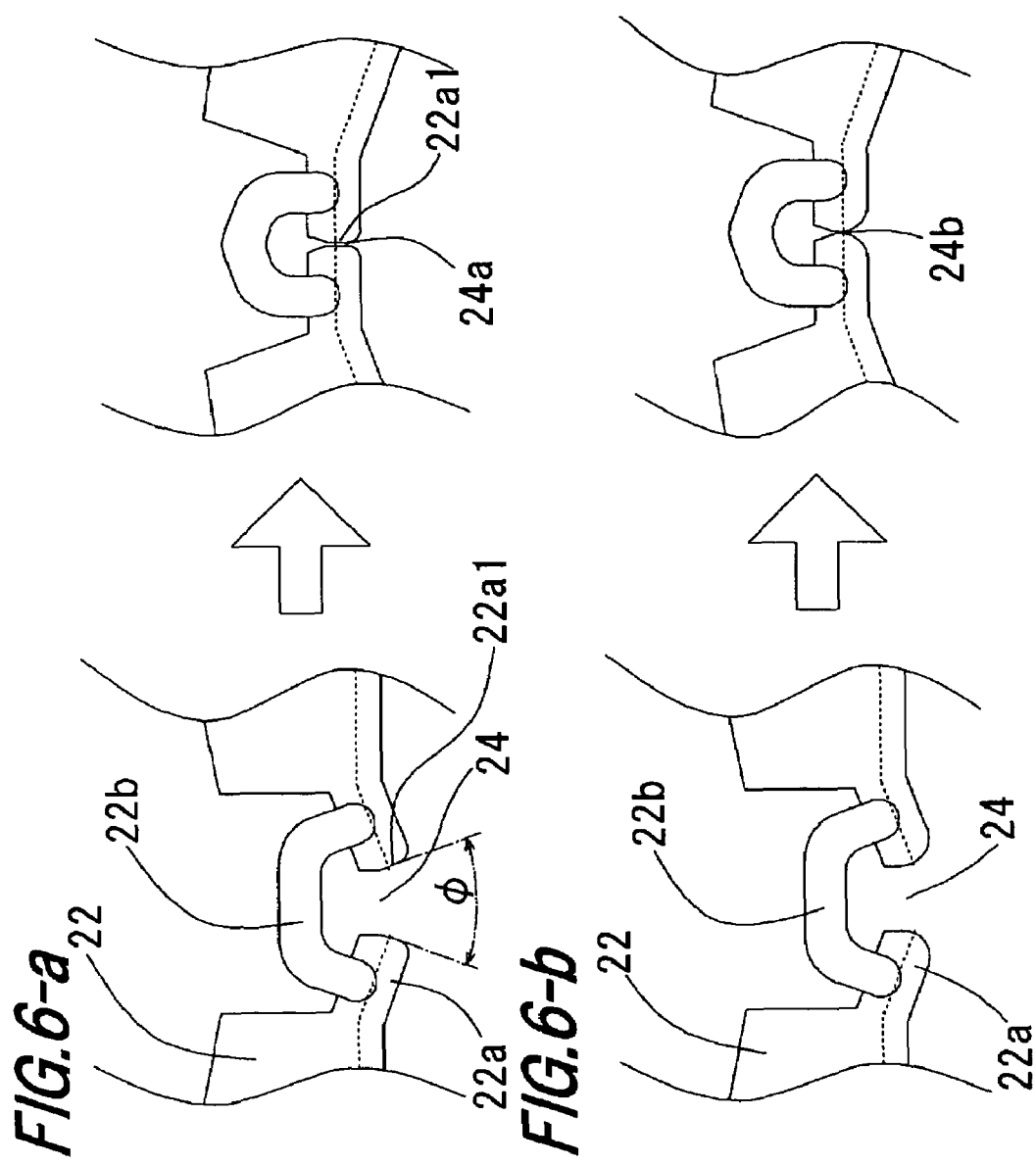
FIG. 6 is a schematic view showing a change between the size of the gap before the laminated cores are bent and the size of the gap after the laminated cores are bent, in which the extension parts have inclined faces of neighboring insulators (6A) or the extension parts do not have inclined faces of neighboring insulators (6B).
Figure 7:
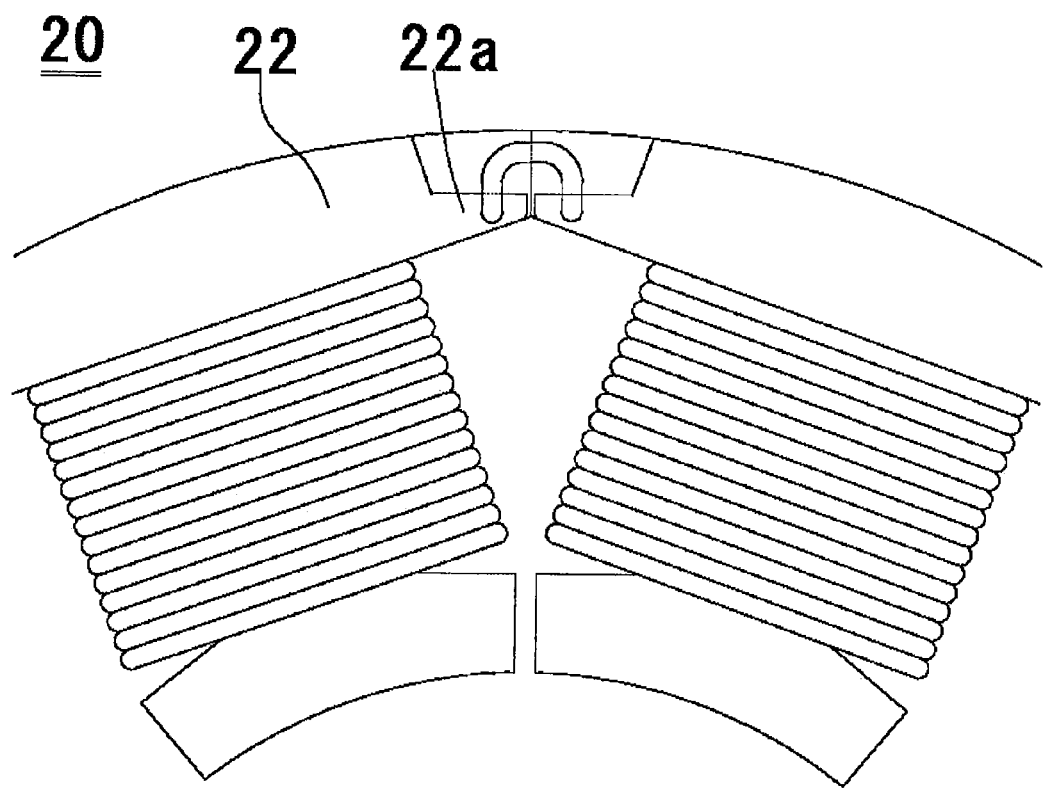
FIG. 7 is an enlarged view of a portion of an example of an armature of the invention.

The armature 20 as a main part of the present invention will now be described with reference to FIGS. 2A and 2B to FIGS. 6A and 6B. FIG. 2A is a top view showing the whole laminated core 21 before it is formed in an annular shape. FIG. 2B is an enlarged view of the dot-line circle of FIG. 2A. An alternate long and short dash line in FIG. 2B shows the center of each of teeth 21b. FIG. 3A is a top view of the whole insulator 22, and FIG. 3B is an enlarged view of the dot-line circle of FIG. 3A. FIGS. 4A and 4B are partial enlarged views of the insulator 22 in FIGS. 3A and 3B. FIG. 4A is a top view, and FIG. 4B is a front view of an extension part 22a. FIG. 5 is a top view of the armature 20 formed in an annular shape. FIGS. 6A and 6B are diagrams showing comparison of the state of a gap 24 at the time of bending between the case where an inclined face 22a1 is provided for the extension part 22a of the insulator 22 and the case where the inclined face 22a1 is not provided. FIG. 6A shows the extension part 22a of the insulator 22, which is provided with the inclined face 22a1. FIG. 6B shows the extension part 22a of the insulator 22, which is not provided with the inclined face 22a1.

Referring to FIG. 2A, the laminated cores 21 as a part of the armature 20 are constructed by a plurality of core back parts 21a formed almost straight and whose outer periphery has a predetermined arc shape, the teeth 21b projected downward from the core back parts 21a, and coupling portions 21c each for coupling the neighboring core back parts 21a (refer to FIG. 2B). An extension part 21b1 which extends to both ends is formed at the lower end of each of the teeth 21b. The number of teeth 21b of the embodiment is nine. The plurality of core back parts 21a are bent annularly, thereby forming a core back 21a1 of the armature 20 (refer to FIG. 5). The coupling portion 21c yields before the core back parts 21a and is elastically deformed at the time of bending the laminated cores 21 annularly.

Referring to FIG. 2B, the coupling portion 21c is provided between the neighboring core back parts 21a, thereby enabling a gap D between the neighboring teeth 21b to be increased only by the amount of the coupling portion 21c. Consequently, the coil 23 can be formed more largely, so that the space factor of the coil 23 in a slot formed in the teeth 21b neighboring in the circumferential direction can be improved. As a result, the efficiency of the brushless motor can be increased.

With reference to FIGS. 3A and 3B, the insulator 22 is formed by two members sandwiching the teeth 21b from the upper and lower sides in the axial direction (the upper and lower sides in the axial direction is a stack direction of thin films of the laminated core 21). The insulator 22 is formed in a shape covering the part except for the facing surface of the driving magnet 80 of the teeth 21b and the top face and the inner peripheral surface of the core back part 21a. Further, a part of the inner peripheral surface of the coupling portion 21c is covered with the extension part 22a. By forming the extension part 22a in a shape covering a part of the inner peripheral surface side of the coupling portion 21c, the coupling portion 21c can be formed largely within the range in which the coupling portion 21c can be bent annularly. Therefore, the gap D between the neighboring teeth 21b can be formed more largely. With the configuration, a nozzle (not shown) of a winding machine for winding an electric conductor around the teeth 21b can move more freely in the circumferential direction of the teeth 21b. Therefore, a longer electric conductor can be wound, and the space factor in the slot formed between the teeth 21b neighboring in the circumferential direction of the coil 23 can be improved. As a result, higher efficiency of the brushless motor can be realized.

With reference to FIG. 4A, a predetermined gap 24 is formed around the coupling portion 21c of the insulator 22. In the case where there is no gap 24, that is, in the case where the entire inner peripheral surface of the core back 21a of the insulator 22 is coupled along the inner peripheral surface of the coupling portion 21c, deformation is concentrated on the insulator 22 on the inner peripheral surface side of the coupling portion 21c at the time of bending the armature 20 annularly. However, since the insulator 22 is coupled along the coupling portion 21c, there is no freedom in deformation of the insulator 22, so that a force which prevents the insulator 22 from bending acts. Therefore, it becomes difficult to bend the armature 20. In addition, deformation is concentrated on the inner peripheral surface side of the coupling portion 21c of the insulator 22, so that the inner peripheral side of the core back part 21a is also deformed. There is a case such that stress is applied on the conductor wound on the inner peripheral side of the core back part 21a. As a result, the conductor between the neighboring teeth 21b comes into contact at the time of bending the armature 20, and there is the possibility that the armature 20 cannot be bent. Consequently, a situation such that the space factor has to be lowered may occur. However, by forming the predetermined gap 24, deforming stress on the insulator 22 can be released at the time of bending the armature 20. Thus, the armature 20 can be bent excellently. Therefore, without deforming the inner peripheral face side of the core back parts 21a of the insulator 22, the space factor of the conductor 23 can be prevented from decreasing.

With reference to FIG. 4B, an insulator coupling part 22b having an U shape in the radial direction and an U shape in the axial direction and coupling the insulators over the gap 24 is formed on the outside in the axial direction of the laminated core 21. Consequently, the insulators 22 do not have to be separately manufactured for the teeth 21b but can be manufactured integrally. The number of parts of the insulator 22 can be therefore largely reduced. Since the insulators 22 can be fixed to all of the teeth 21b at once, the number of assembling steps can be largely reduced. The insulator coupling part 22b is formed thinly so as to be deformed more easily than the insulator 22 body. In particular, by forming the insulator coupling part 22b in the U shape in the radial direction, the insulator coupling part 22b is deformed so that both ends on the open sides of the U shape in the radial direction come closer to each other at the time of bending the laminated core 21. Therefore, in the case where the insulator coupling part 22b has the U shape in the radial direction, the insulator coupling part 22b can be bent using the outside in the radial direction which is the bottom as a fulcrum, so that the insulator coupling part 22b can be deformed more easily.

With reference to FIG. 4A, the coupling portion 21c of the laminated core 21 is inclined downward of the core back part 21a (to the inside in the radial direction when the armature 20 is bent annularly). The extension part 22a is inclined downward so as to come into contact with the coupling portion 21c. The inclined face 22a1 is formed on the lower side of the opposite face of the neighboring extension part 22a. The angle φ formed by the neighboring inclined faces 22a1 is set to 360/n degrees or less when the number of teeth 21b is n. For example, in the embodiment, the number of teeth 21b is nine, so that the angle φ formed between the neighboring inclined faces 22a1 is 40 degrees.

After fixing the insulator 22 to the laminated core 21, the conductor 23 is wound around each of the teeth 21b. The conductor 23 is wound around a predetermined tooth 21b and, after that, moved to another predetermined tooth 21b. The brushless motor of the embodiment of the invention is a three-phase motor, and the number of teeth of the armature 20 is nine. Therefore, when the conductor 23 moves to another predetermined tooth 21b, the conductor 23 skips two teeth 21b. When the conductor 23 runs on the upper side of one of the two teeth 21b, it runs on the lower side of the other tooth 21b and is wound around the next tooth 21b. Therefore, the conductor runs along the inner peripheral surface of the coupling portion 21c. By making the conductor run alternately on the upper and lower sides in the axial direction, proper tension can be given to the conductor that runs. It can prevent slacking of the conductor.

With reference to FIG. 5, in the case of forming the armature 20 annularly, the extension part 22a of the insulator 22 is formed so as to be smaller than the diameter of the conductor. The diameter of the conductor denotes here the outside diameter of the section taken along a plane perpendicular to the longitudinal direction of the conductor. With the arrangement, the conductor running along the inner peripheral surface of the coupling portion 21c tends to extend to the outside in the radial direction and enter the gap 24 in the insulator 22 at the time of forming the armature 20 in an annular shape. However, by forming the gap 24 to be smaller than the diameter of the conductor, entry of the conductor to the gap 24 can be prevented. Therefore, a very reliable brushless motor can be provided.

With reference to FIG. 6A, by forming the armature 20 in the annular shape, a gap 24a formed between the inclined faces 22a1 of the extension parts 22a of the insulator 22 is formed so as to be almost parallel or so as to decrease to the inside in the radial direction as shown on the right side of FIG. 6A. In contrast, with reference to FIG. 6B, in the case where the inclined faces 22a1 are not formed, a portion which is almost parallel or decreases toward the inside in the radial direction is not formed in a gap 24b, and the gap 24b is formed so as to extend to the inside and outside in the radial direction as show in the right side of FIG. 6B. Consequently, the portion smaller than the diameter of the conductor in the gap 24b is very small. As a result, in the case where the conductor enters the gap 24b even slightly, the conductor comes into contact with the laminated core 21, and short-circuit may occur between the laminated core 21 and the conductor. However, by forming the gap 24a as shown in FIG. 6A, since the gap 24a is formed so as to be smaller than at least the cross section of the conductor, contact between the conductor and the laminated core 21 can be prevented. Even if the conductor enters the gap 24a, due to the long distance in the radial direction of the gap 24a, the conductor can be prevented from coming into contact with the laminated core 21. Therefore, an armature free from electric short-circuit between the conductor and the laminated core 21 and a very reliable brushless motor can be provided.

Although an embodiment of the present invention has been described above, the invention is not limited to the embodiment but can be variously modified and changed.

What is claimed is:

1. An armature formed by winding coils around laminated cores and bending the laminated cores in an annular shape, comprising:

a plurality of core back parts circularly arranged to form an annular core back, each of the core back part having a tooth projecting toward a center of the annular core back;

coupling portions of the core back, which couple the core back parts neighboring in a circumferential direction of the annular core back and yield at the time of bending;

a plurality of insulators, each of the insulator attached to each of the core back part to cover an inner peripheral face of the core back part and a surface of the tooth, and made of an electrically insulating material; and coils formed by continually winding a conductor around the teeth over the insulators, the conductor extending at radially inner positions to the coupling portion of the core back;

wherein:

a side edge in the circumferential direction of the insulator is positioned closely to a neighboring insulator forming a gap; and a diameter of the conductor measured perpendicular to a longitudinal direction thereof is greater than a width of the gap.

2. The armature according to claim 1, wherein a part of the insulator covering the inner peripheral surface of the core back part has an extension part at a side thereof extending toward the circumferentially neighboring insulator, the extension part having thinner thickness in a radial direction of the annular core back than that of a body of the insulator.

3. The armature according to claim 1, wherein the insulator further comprises an insulator coupling part for coupling insulators neighboring in the circumferential direction, and the coupling part is deformed more easily than the insulator body at the time of bending.

4. The armature according to claim 2, wherein an inner peripheral face of the extension part is bent toward the center of the annular core back.

5. The armature according to claim 2, wherein the side edge of the extension part and the surface of the insulator neighboring the side edge in the circumferential direction are parallel with each other or the gap therebetween increases toward the outside in the radial direction.

6. The armature according to claim 5, wherein the gap between the side edge of the extension part and the surface of the neighboring insulator is smaller, on the side closest to the center axis, than the diameter of the electric conductor.

7. The armature according to claim 2, wherein the insulator has an coupling part that couples insulators neighboring in the circumferential direction;

at least two neighboring insulators are coupled by a coupling part which is connected to the insulators at the extension parts thereof; and the coupling part is deformed more easily than the bodies of the insulators at the time of bending.

8. A motor comprising:

the armature according to claim 1;

a rotator rotating about a predetermined rotation axis and having a driving magnet that faces the inner peripheral surface of the teeth in the radial direction; and a bearing rotatably supporting the rotator.

* * * * *